US012424373B2

(12) United States Patent
Martins Carvalho et al.

(10) Patent No.: US 12,424,373 B2
(45) Date of Patent: Sep. 23, 2025

(54) MODULAR SYSTEM APPLIED TO TRANSFORMERS

(71) Applicant: EFACEC ENERGIA—MAQUINAS E EQUIPAMENTOS ELECTRICOS S.A., Sao Mamede de Infesta (PT)

(72) Inventors: Carlos Manuel Martins Carvalho, Sao Mamede de Infesta (PT); Helder Fernando Goncalves Mendes, Sao Mamede de Infesta (PT); Luis Miguel Ribeiro Felix, Sao Mamede de Infesta (PT); Sergio Manuel Oliveira Tavares, Sao Mamede de Infesta (PT); Jose Rui Marcelino, Sao Mamede de Infesta (PT)

(73) Assignee: EFACEC ENERGIA—MAQUINAS E EQUIPAMENTOS ELECTRICOS S.A., Sao Mamede de Infesta (PT)

( * ) Notice: Subject to any disclaimer, the term of this patent is extended or adjusted under 35 U.S.C. 154(b) by 1023 days.

(21) Appl. No.: 17/442,054

(22) PCT Filed: Mar. 17, 2020

(86) PCT No.: PCT/IB2020/052435

§ 371 (c)(1), (2) Date: Sep. 22, 2021

(87) PCT Pub. No.: WO2020/194128

PCT Pub. Date: Oct. 1, 2020

(65) Prior Publication Data

US 2022/0181063 A1 Jun. 9, 2022

(30) Foreign Application Priority Data

Mar. 22, 2019 (PT) ........................................ 115386

(51) Int. Cl.
*H01F 27/10* (2006.01)
*H01F 27/02* (2006.01)

(52) U.S. Cl.
CPC ........... *H01F 27/10* (2013.01); *H01F 27/025* (2013.01)

(58) Field of Classification Search
CPC ............................... H01F 27/10; H01F 27/025
(Continued)

(56) References Cited

U.S. PATENT DOCUMENTS 3,137,829 A 6/1964 Dillow et al.
8,659,378 B2 * 2/2014 Bonin ................. H01F 27/2876 336/55

(Continued)

FOREIGN PATENT DOCUMENTS

CN 202523507 U * 11/2012
CN 206961636 U * 2/2018

(Continued)

OTHER PUBLICATIONS

International Search Report and Written Opinion dated Aug. 10, 2020 for PCT/IB2020/052435 dated Jul. 9, 2020.

*Primary Examiner* — Shawki S Ismail
*Assistant Examiner* — Joselito S. Baisa
(74) *Attorney, Agent, or Firm* — LUCAS & MERCANTI, LLP

(57) ABSTRACT

A modular system applied to transformers, particularly power transformers, which comprises a structure having modules coupled between each other by fixation means, in such a manner that, the set thus formed, is positioned in the perimeter of the tank of the transformer and to which it is possible to connect several equipment and components, so that the referred components and equipment are positioned in the interior of the tank of the transformer, thus permitting
(Continued)

the access to the referred components and equipment, when carrying out maintenance, supervision or control work, as well as to permit the optimization in the manufacture thereof, assembly, transport and installation.

13 Claims, 10 Drawing Sheets

(58) Field of Classification Search
USPC ............................................................ 336/55
See application file for complete search history.

(56) References Cited

U.S. PATENT DOCUMENTS

| | | | | |
|---|---|---|---|---|
| 10,707,006 | B2 * | 7/2020 | Ettl | H01F 27/08 |
| 11,631,533 | B2 * | 4/2023 | Cheim | H01F 27/10<br>336/55 |
| 2016/0118186 | A1 * | 4/2016 | Frimpong | F41J 5/056<br>307/119 |
| 2017/0316864 | A1 | 11/2017 | Ettl | |
| 2020/0032995 | A1 * | 1/2020 | Frazier | F22B 33/10 |

FOREIGN PATENT DOCUMENTS

| | | | | |
|---|---|---|---|---|
| DE | 2436839 | A1 | | 2/1976 |
| EP | 3057112 | A1 | | 8/2016 |
| JP | 2010003931 | A | * | 1/2010 |

* cited by examiner

MODULAR SYSTEM APPLIED TO TRANSFORMERS

CROSS-REFERENCE TO RELATED APPLICATIONS

This application is a 371 of PCT/IB2020/052435, filed Mar. 17, 2020, which claimed the priority of Portuguese Application No. 115386, filed Mar. 22, 2019, both of which are incorporated herein by reference.

TECHNICAL FIELD

The present invention refers to a modular system applied to transformers, particularly power transformers.

BACKGROUND OF THE INVENTION

Power transformers are large dimensioned products that, due to their complexity normally present a wide range of accessories and external components, that permit the correct working and control of the system during its lifespan.

The assembly time for all the equipment is a factor to be considered within the total time for project/manufacture/transport and installation of a coupled to the installation tank, or in structural supports fixed in the tank of this transformer. The transformer tank, comprised of panels with welded structural reinforcements is projected in such a manner as to meet the various requirements imposed, namely the requirements of the accessories and external equipment. Additionally, it must resist the different efforts to which the transformer is subject, from the manufacture thereof to the expiry of its lifespan.

The transportation of the transformer from the factory up to its place of destination is also one of the critical aspects during the project, where starting from determined dimensions it is necessary to dismantle the components of the transformer, so that it is possible to carry out the transportation within the possible dimensions and reassemble the referred components at their destination, with consequent expenditure of time and costs.

The above-referred problems may be reduced by means of the modularization and optimization of the installation of the accessories and external equipment.

SUMMARY

The present application describes a modular system applied to transformers that comprises a structure of modules of different dimensions, placed in the perimeter of the transformer tank and coupled to this by means of flanged connections, comprised of piping, where the piping of the larger dimensioned modules and those of smaller dimensions are coupled between each other by means of flanged connections, wedge, blind flange and stud mount and the piping of the larger dimensioned modules comprise in their interior outlines and channels and in their exterior rails and the larger dimensioned modules support ventilation and cooling systems in their horizontal piping and the smaller dimensioned modules, that are comprised of vertical piping and upper and lower horizontal piping, support auxiliary circuit boxes, monitoring systems and valve pipelines.

In one embodiment, the piping of the larger dimensioned modules and of the smaller dimensions of the modular system applied to transformers are coupled between each other by a flanged wedge connection by means of a machined blind flange, with a threaded hole and having resource to a washer and screw.

In another embodiment, the piping of the larger dimensioned modules and those with smaller dimensions of the modular system applied to transformers are coupled between each other by means of a connection made through the fitting of a bent plate belonging to one of the piping where two bearings placed respectively in the lower and upper and profile of the piping are used, where the upper bearing is used as a fitting and the lower bearing presents a threaded hole to guarantee the fixation through a screw and washer.

In still another embodiment, the piping of the larger dimensioned modules and of the smaller dimensioned modules of the modular system applied to transformers are coupled between each other through a blind flange with a shape at the extremity so that it fits with the other piping to be connected, through a washer and a screw.

In one embodiment, the piping of the larger dimensioned modules and of the smaller dimensioned modules applied to transformers are coupled between each other through two bearings, that work fitted to a flange with freedom of movements and which is screwed by a screw and washer.

In another embodiment, in the modular system applied to transformers, the refrigeration liquid circulates through the horizontal piping between the transformer tank and the radiators of the cooling system and as the horizontal piping is connected to the transformer tank by means of a flanged connection, with pipe and flange and integration with a valve, the referred flanged connection being guaranteed with the use of screws, nuts and washers.

In still another embodiment, the connection between the horizontal piping and the transformer tank of the modular system applied to transformers is made in each exit/entry of the cooling liquid of the transformer tank.

In one embodiment, the ventilation system of the modular system applied to transformers is surrounded by fairings, which may be individual or whole, covering all the modules or just each one of the modules of the ventilation system and by the modules of the ventilation system being configurable.

In another embodiment, the number of radiators of the cooling system of the modular system applied to transformers is configurable.

In one embodiment, the piping of the larger dimensioned modules and of the smaller dimensioned modules of the modular system applied to transformers are circular, oval, rectangular, or other polygon with variable number of sides.

In one embodiment, the electrification cables of the external components and equipment of the modular system applied to transformers are housed in rails coupled to the piping of each module or in the interior of the piping themselves, adapting their outline for the purpose.

In another embodiment, the electric connections between modules of the modular system applied to transformers are guaranteed by sealed plugs that connect one by one.

In still another embodiment, the monitoring systems of the modular system applied to transformers has remote access modules coupled to it.

DESCRIPTION

The present invention refers to modular system applied to transformers, particularly power transformers, that comprises a structure consisting of modules (1,2,3,4) coupled between each other by fixation means, in such a manner that, the set thus formed, is positioned in the perimeter of the tank (5) of the transformer and to which it is possible to connect several equipment components, so that the referred components and equipment are positioned in the interior of the tank (5) of the transformer, thus permitting the access to the referred components and equipment, when carrying out maintenance, supervision or control work, as well as to permit the optimization in the manufacture thereof, assembly, transport and installation.

Each module (1,2,3,4) is built with resource to piping, which may be of several materials and shapes, where the connection between them is operated in different manners, according to each case. The referred piping, apart from their structural function, have also the function of transporting the cooling liquid between the tank (5) of the transformer and the ventilation system (23) and simultaneously work as support for the passage of electrification cables of the components and external equipment as well as for the electrification and network interconnection of all data acquisition systems and control/monitoring. These electric connections between modules (1,2,3,4) are guaranteed by sealed plugs (46) which have only the possibility of connecting one by one and that permit the interconnection of all the systems in a quicker manner, guaranteeing total reliability without the need of a delayed validation of the electric connections when of the final assembly of the transformer.

In the same manner, the dimensions of the modules (1,2,3,4) may vary between themselves, whereby, however, in their habitual configuration, the structure is comprised of two larger dimensioned modules (1,2) and two other smaller dimensioned modules.

In the usual embodiment of the structure, the connections between the piping and through this way, the connections between the modules (1,2,3,4) that comprise the referred structure are now explained.

As illustrated in FIGS. 2 and 3, the connection between the piping of the larger dimensioned modules (1,2) and of the smaller dimensioned modules (3,4) may be made, through a flanged connection, the referred fixing being made through washers (6) and screws (7). It is noted that these connections permit the sealing of the piping, since they may be used for the passage of cooling liquid, as will be explained ahead.

In another embodiment, illustrated in FIG. 4, the connection may be wedge made through a machined blind flange (8), which, with a threaded hole permits the connection between piping with resource to washer (9) and screw (10).

In FIG. 5 it is illustrated, in turn, a connection made through fitting of a bent plate belonging to one of the piping. So as to guarantee a structural connection sufficiently capable of mechanically assuring the structure, two bearings (11, 12) are used, placed respectively in the lower and upper and piping outline, where the upper bearing (12) is used as a fitting and the lower bearing (11) presents a threaded hole to guarantee the fixation by means of a screw (13) and washer (14).

In turn, FIG. 6 illustrates another form of connection that guarantees the sealing of the piping, through a blind flange (15) with a shape in the extremity that permits fitting with the other piping to be connected. Once again, a washer (16) is used and a screw (17), to guarantee the stability of the connection and prevent movement of the piping.

In FIG. 7, another wedge connection is presented, with the purpose of permitting access to the interior of the piping. In this manner, the connection between the piping is made through two bearings (18, 10), that function as fitting to a flange (20) with freedom of movement in several directions and that is screwed through a screw (21) and washer (22).

As previously referred, different components may be connected to the modules (1,2,3,4), which, by this way, are positioned outside of the tank (5) of the transformer permitting its direct access.

Thus, and as illustrated in FIG. 8, in the particular case of the larger dimensioned modules (1,2), these may support the cooling (23) and ventilation (22) systems—in spite of permitting the coupling of other accessories, such as for example control valve piping—and also working as collectors and distributors of cooling liquid, which passes in the interior of the outline (48) of the horizontal piping (24, 26) that comprise the referred larger dimensioned modules (1,2), or through channels (49) placed in the interior of the outline (48), of the referred horizontal piping (24, 26). The cooling liquid thus circulates in the horizontal piping (24,26) between the tank (5) of the transformer and the radiators of the cooling system (23) which are coupled through a flanged connection, with pipe (28) and flange (29) as is illustrated in FIG. 9, permitting the isolation of the connection, with the integration of a valve (30), thus avoiding escape of the cooling liquid in the interior of the tank (5) from the transformer to the exterior, during assembly/dismantling of the modules (1,2). In turn, the connection of the radiators of the cooling system (23) to the modules (1,2) of the transformer may also be made with quick couplings, reducing or eliminating the number of screwed connections. Examples of these connections are the camlock coupling or snap clamp represented in FIG. 15.

It is noted that this connection is made in each exit/entry of cooling liquid in the tank (5) of the transformer, where these connections may be placed in different points, as illustrated in FIG. 18, the flanged connection guaranteed with the use of screws (31), nuts (32) and washers (33) as previously indicated, being preferred.

This form of connection further permits that, during transportation, components such as the cooling (23) and ventilation (22) systems may easily couple through the quick screwed connection (34) so as to facilitate the handling thereof, as is illustrated in FIG. 10.

It is further noted the possibility of positioning of fairings (27) surrounding the ventilation system (22), which may be individual or whole, covering all the modules or just each one of the modules of the ventilation system (22), as is illustrated in FIG. 19, so as to minimize the noise produced by the ventilators, which are responsible for a significant part of the noise produced by a transformer when working.

It is noted that, together with the remaining modules (3,4), the modules (1,2) guarantee the possibility of supporting the necessary cabling for the working of the transformer. Said cabling is positioned in rails (43) coupled to the piping of each module (1,2,3,4) according to the specifications adopted in each project or in the interior of the piping themselves, adapting their outline (44,45) to this effect.

As previously indicated the cable connection between modules and between the modules and the components or equipment, is guaranteed by sealing plugs (46) that only assemble with the sole male/female guaranteeing speed and reliability to the mounting.

The entire structure is configurable, through the configuration of the modules (1,2,3,4) and respective components, from the shape of the piping (which may be circular, oval, rectangular, or other polygon with variable number of sides) as is illustrated in FIG. 11, the number of radiators in the cooling system (23) and the ventilation system, being also possible the use of just horizontal piping (24) where the distribution of the cooling liquid is made, which is represented in FIG. 20 and a preferred configuration of the modular system. In these situations, the vertical piping (25) of the smaller dimensioned modules (3,4) will belong to the modules that are perpendicular to these modules (3,4) where the connections to the horizontal piping in the final assembly will be maintained. These possible configurations are foreseen in global requirements for working of transformers.

In cases where the dimension of the radiators of the cooling system (23) is insufficient to carry out the direct connection between the radiators of the cooling system (23) and the main piping of the modules (1,2,3,4) an intermediary piping (47) is added that will make this connection as illustrated in FIG. 16. In the eventuality that the radiators present a dimension that is equal to the distance between piping, the module would present the shape illustrated in FIG. 17.

In turn, the modules with smaller dimensions (3,4), which are comprised of vertical piping (38,42) and upper horizontal piping (39) and lower horizontal piping (40), will have the function of supporting accessories and exterior equipment, such as auxiliary circuit boxes (35), monitoring systems (36), valve piping (37), for which it is necessary to have a control and facilitated access.

It is noted that the monitoring systems (36) may have remote access modules coupled in a manner that all the several working parameters of the transformer may be monitored remotely through the mobile or fixed devices.

These smaller dimensioned modules (3,4) may or not have the need to support the conserver (41)—coupled in its habitual configuration—through the upper horizontal piping (39) and the vertical piping (38) that offer rigidity to the structure, where the positioning of these components as regards the transformer is dependent on initial conditions of the project, the integration may be variable between the smaller dimensioned modules (3,4).

The configuration of these smaller dimensioned modules (3,4) equally prevents the dismantling of the components for transportation, consequently permitting a quicker final assembly at the client, be it through containers or transportation trucks, as illustrated in FIG. 13.

DESCRIPTION OF THE FIGURES

For an easier understanding of the present application the figures are attached which, represent embodiments that, however, do not intend to limit the technology disclosed herein.

1 and 2—larger dimensioned modules;
3 and 4—smaller dimensioned modules;
5—tank.

Figure 1:
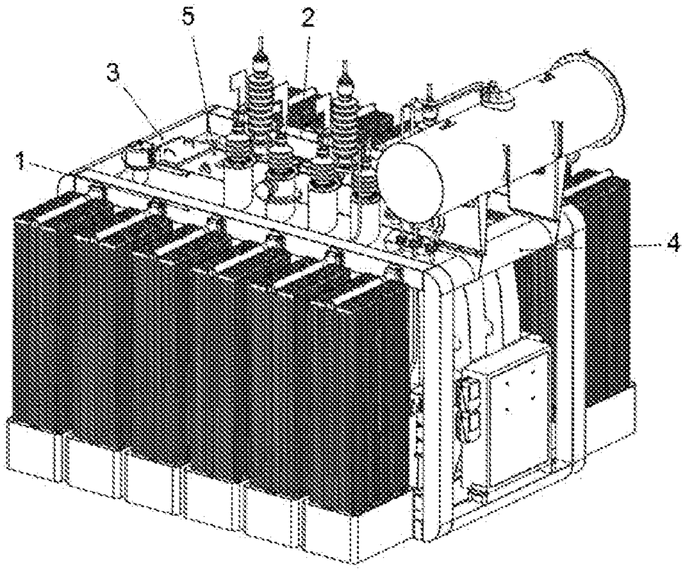
FIG. 1: Schematic representation of the modular system applied to transformers, where the following numerical references represent.
Figure 2:
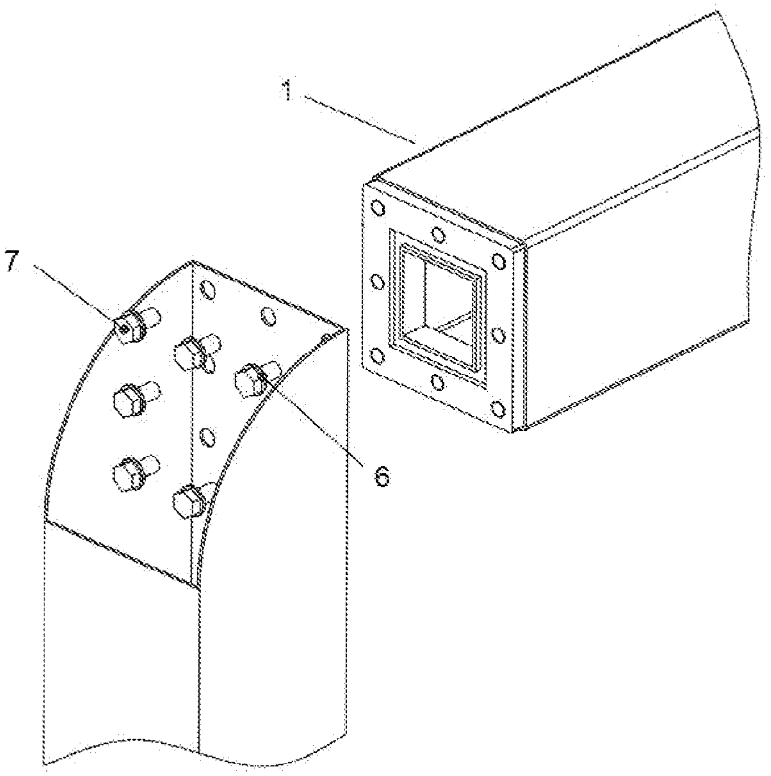

FIG. 2: Schematic representation of the connection between the larger dimensioned modules and those with smaller dimensions, where the following numerical references represent:

1—larger dimensioned modules;
6—washers;
7—screws.

Figure 3:
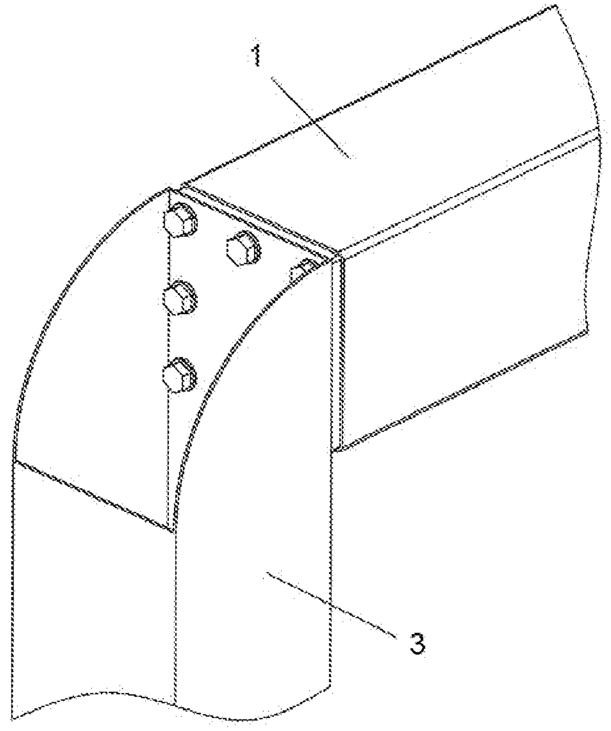

FIG. 3: Schematic representation of the connection between the piping of the larger dimensioned modules the smaller dimensioned ones, where the following numerical references represent:

1—larger dimensioned modules;
3—smaller dimensioned modules.

Figure 4:
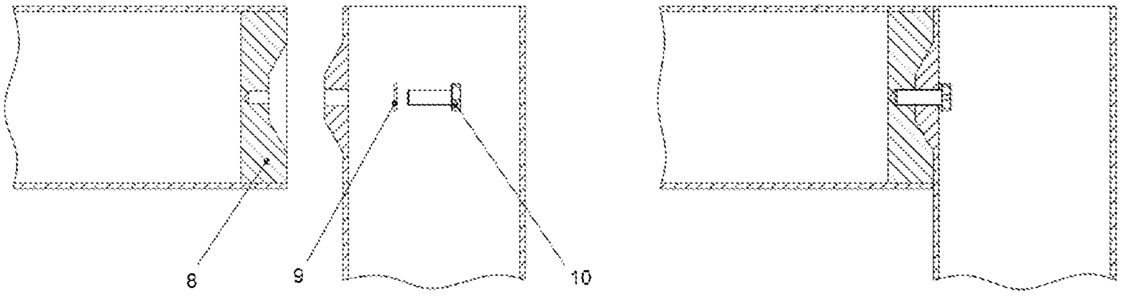

FIG. 4: Schematic representation of the connection between the piping of the larger dimensioned modules and those with smaller dimensions, where the following numerical references represent:

8—machined blind flange;
9—washer;
10—screw.

Figure 5:
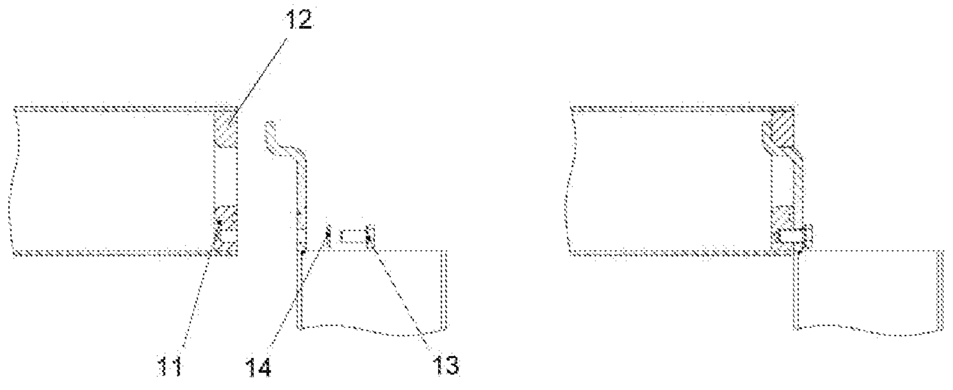

FIG. 5: Schematic representation of the connection between the piping of the larger dimensioned modules and those with smaller dimensions, where the following numerical references represent:

11—lower bearing;
12—upper bearing;
13—screw;
14—washer.

Figure 6:
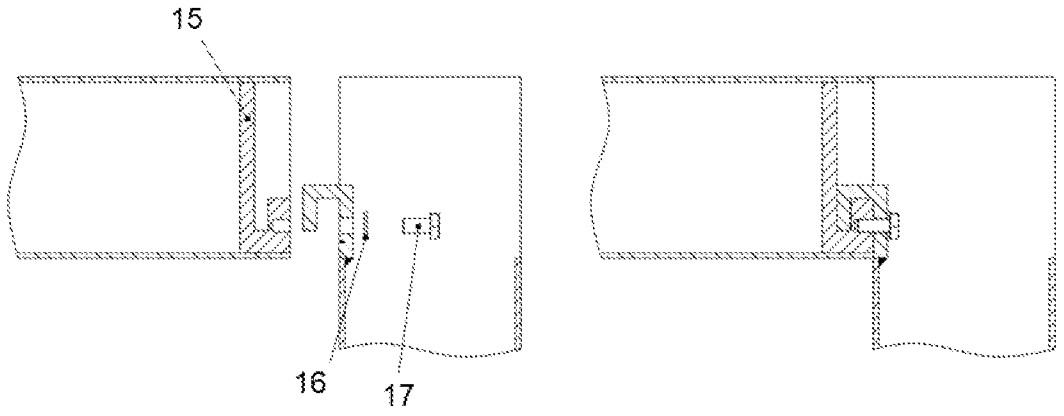

FIG. 6: Schematic representation of the connection between the piping of the larger dimensioned modules and those with smaller dimensions, where the following numerical references represent:

15—blind flange;
16—washer;
17—screw.

Figure 7:
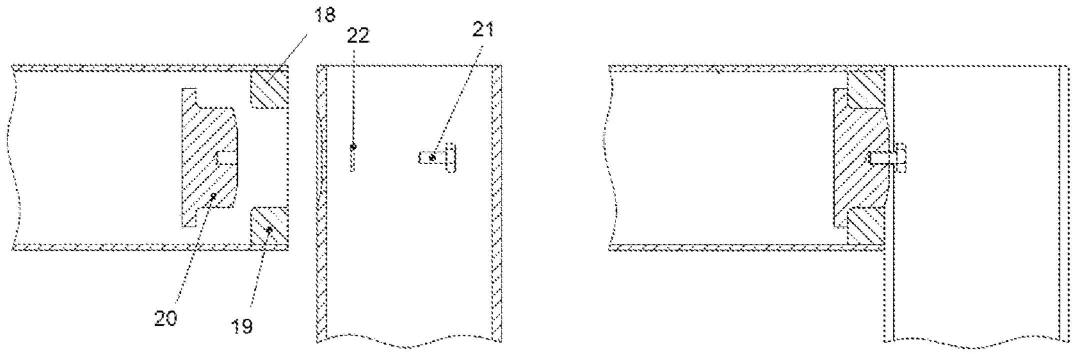

FIG. 7: Schematic representation of the connection between the piping of the larger dimensioned modules and those with smaller dimensions, where the following numerical references represent:

18 and 19—bearings;
20—flange;
21—screw;
22—washer.

Figure 8:
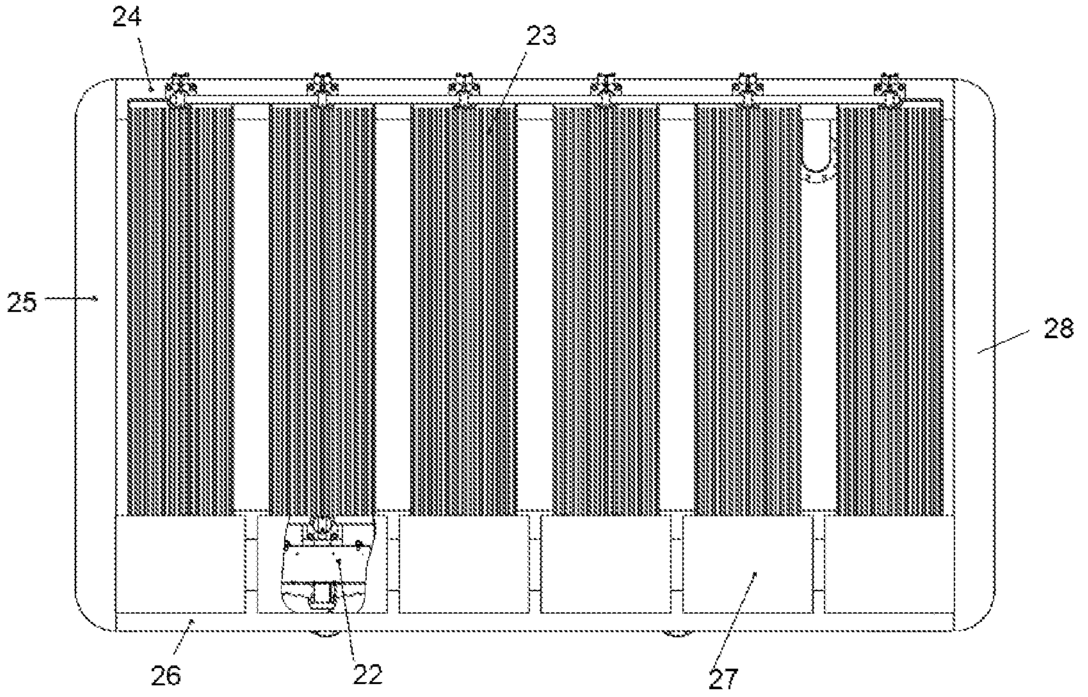

FIG. 8: Schematic representation of the cooling and ventilation systems positioned in the larger dimensioned module, where the following numerical references represent:

23—cooling systems;
24—horizontal piping;
25—vertical piping;
26—horizontal piping;
27—fairings;
28—piping.

Figure 9:
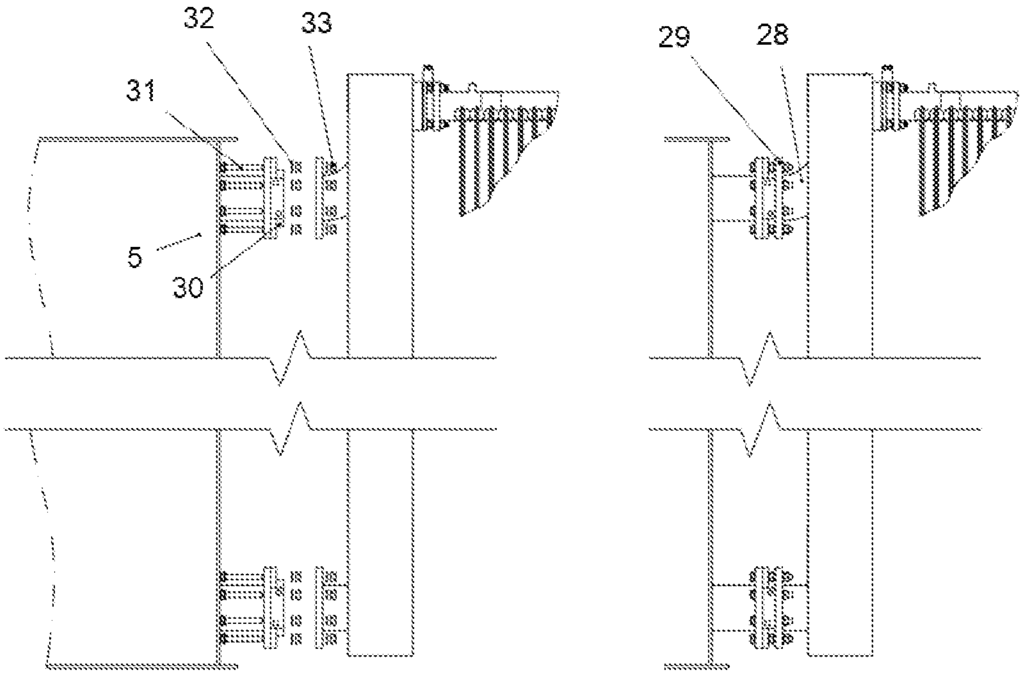

FIG. 9: Schematic representation of the connection between the transformer tank and the radiators of the cooling system, where the following numerical references represent:

5—tank;
28—piping;
29—flange;
30—valve;
31—screws;
32—nuts;
33—washers.

Figure 10:
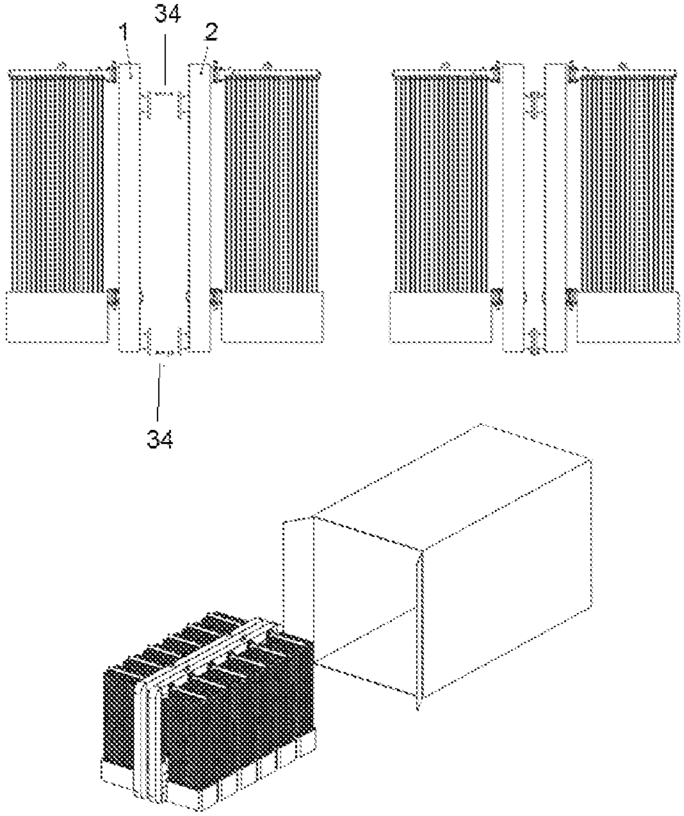

FIG. 10: Schematic representation of the handling and transportation of the cooling systems, where the following numerical references represent:

1 and 2—larger dimensioned modules;
34—quick screwed connection.

Figure 11:
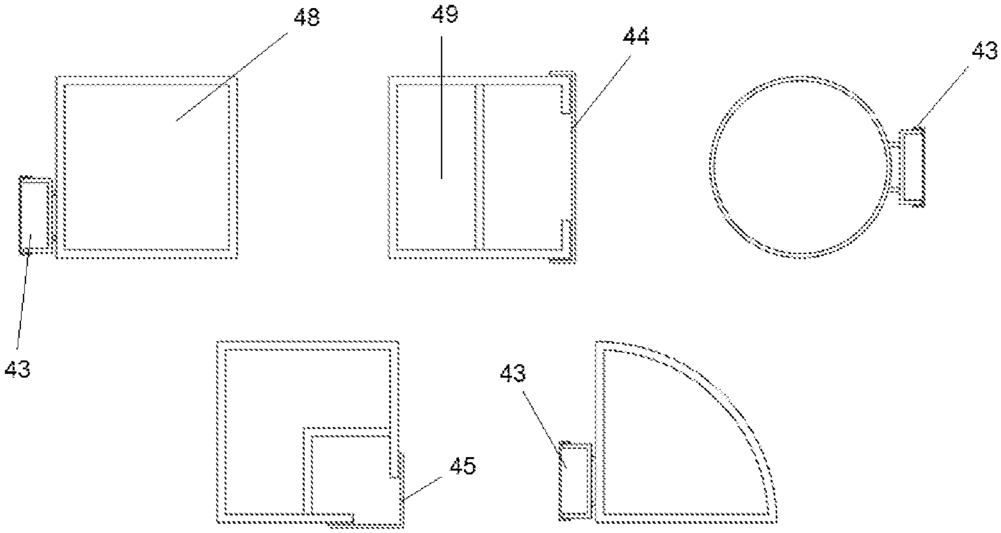

FIG. 11: Schematic representation of the shape of the piping, where the following numerical references represent:

43—rails;
44 and 45—outlines of piping;
48—interior of outline;
49—channels.

Figure 12:
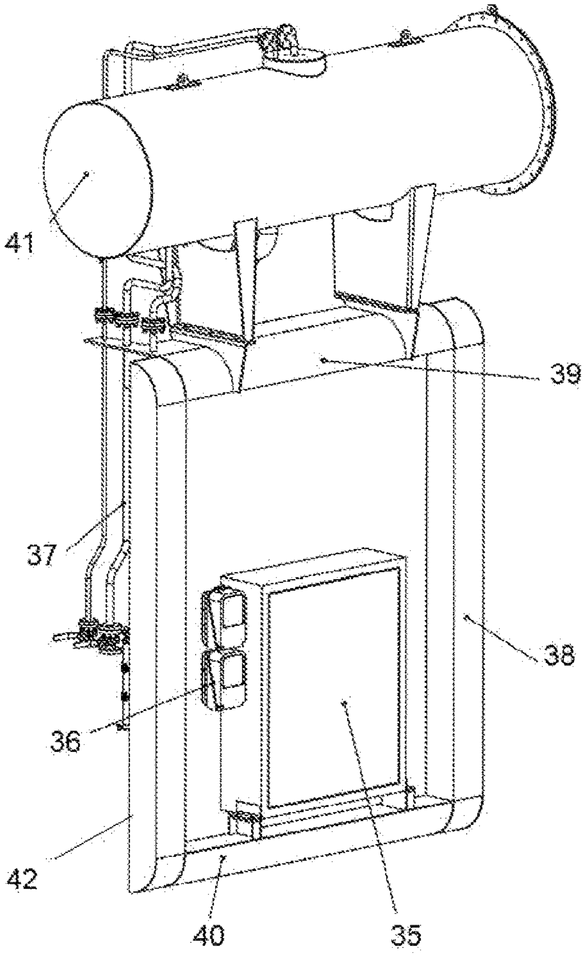

FIG. 12: Schematic representation of the smaller dimensioned module with the conserver, where the following numerical references represent:

35—auxiliary circuit boxes;
36—monitoring systems;
37—valve piping;

38—vertical piping;

39—upper horizontal piping;

40—lower piping;

41—conserver;

42—vertical piping.

Figure 13:
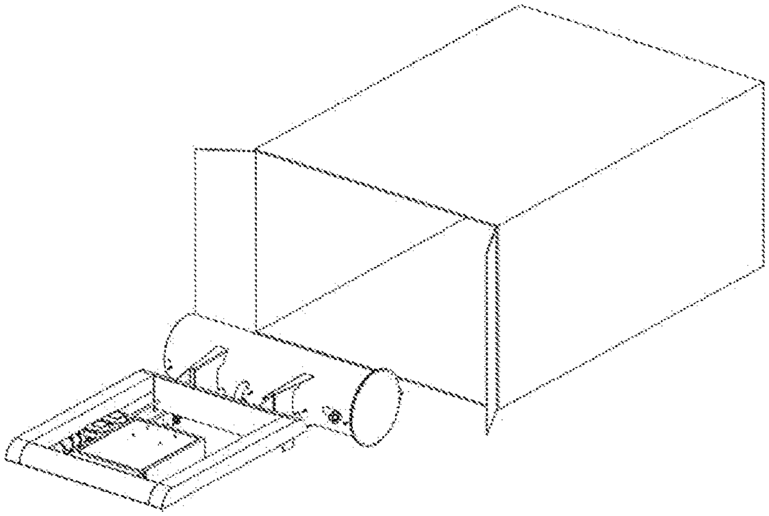

FIG. 13: Schematic representation of the handling and transportation of the smaller dimensioned modules.

Figure 14:
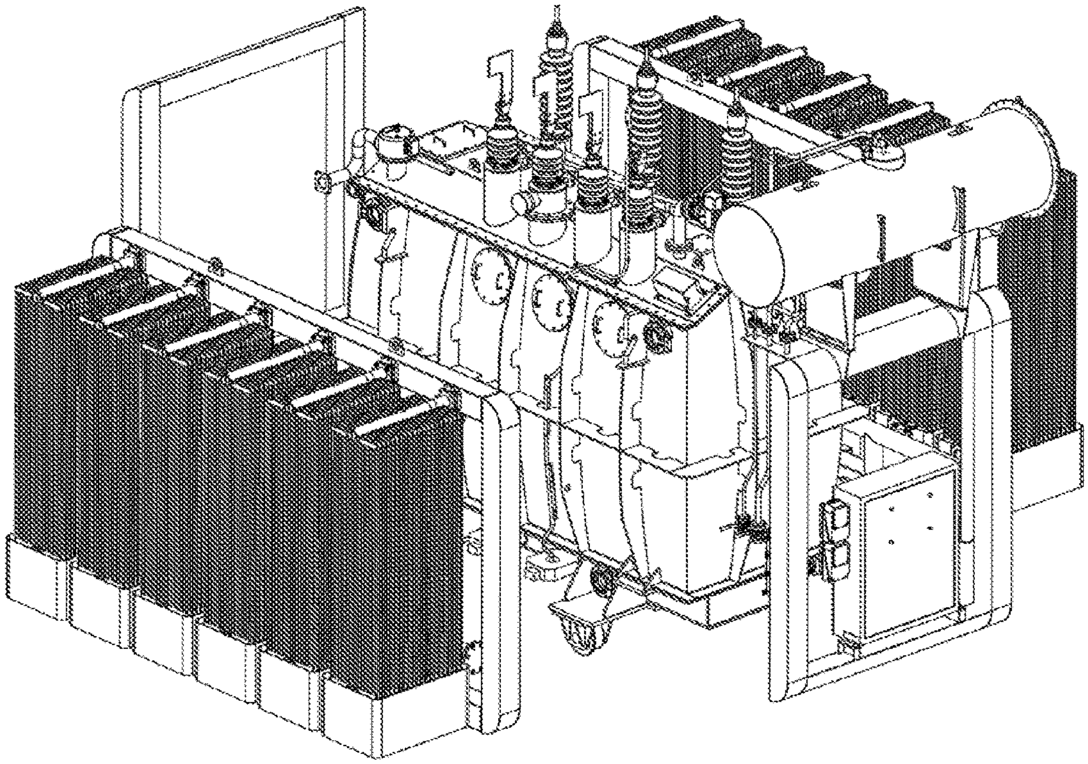

FIG. 14: Schematic expanded representation of the modular system applied to transformers.

Figure 15:
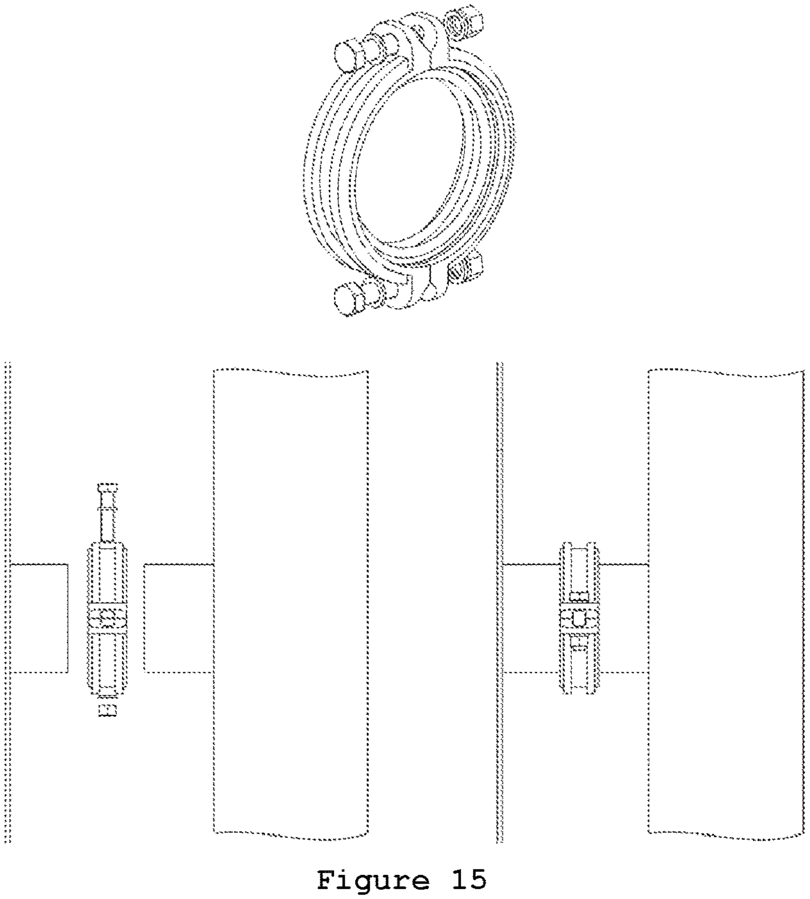

FIG. 15: Schematic representation of the radiators of the cooling system (23) to the transformer modules, through "camlock coupling" or "snap clamp".

Figure 16:
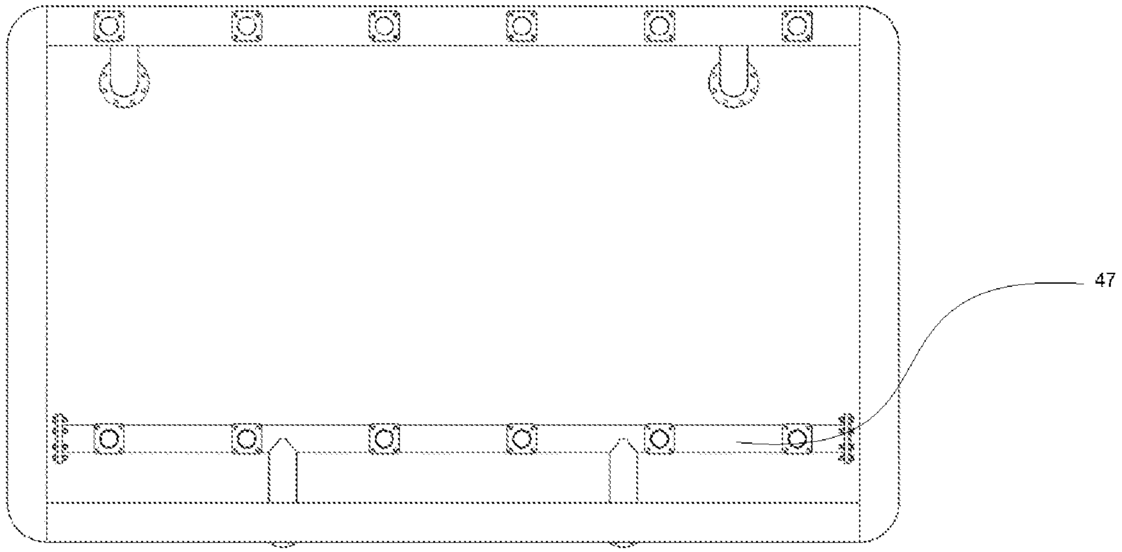

FIG. 16: Schematic representation of the intermediary piping to make the connection between the radiators of the cooling system and the main piping of the modules, where the following numerical references represent:

47—intermediary piping.

Figure 17:
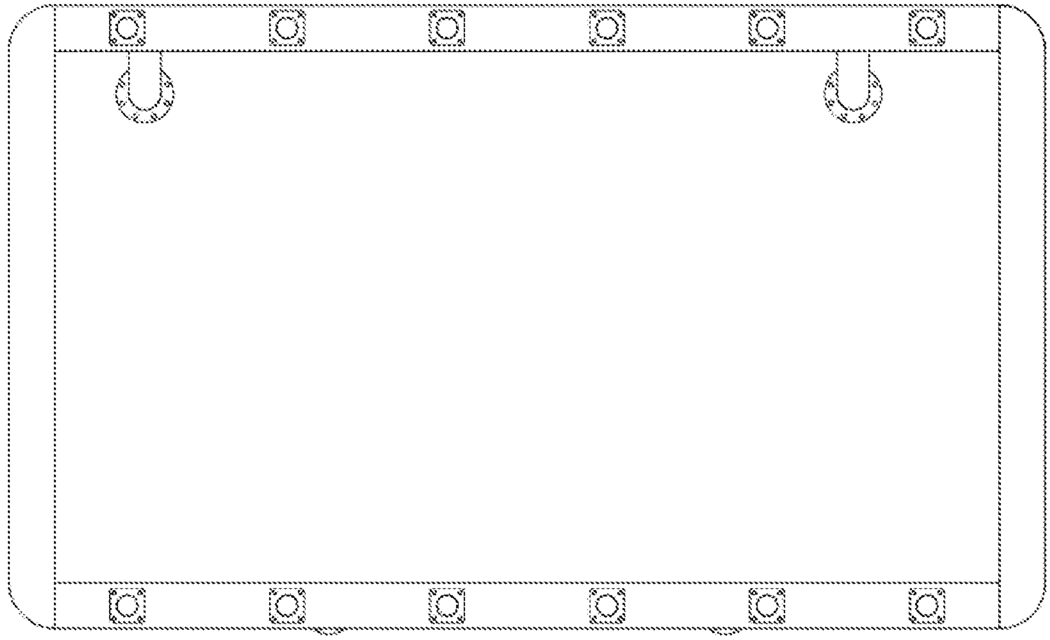

FIG. 17: Schematic representation of the shape of the module in case the radiators present a dimension equal to the distance between piping.

Figure 18:
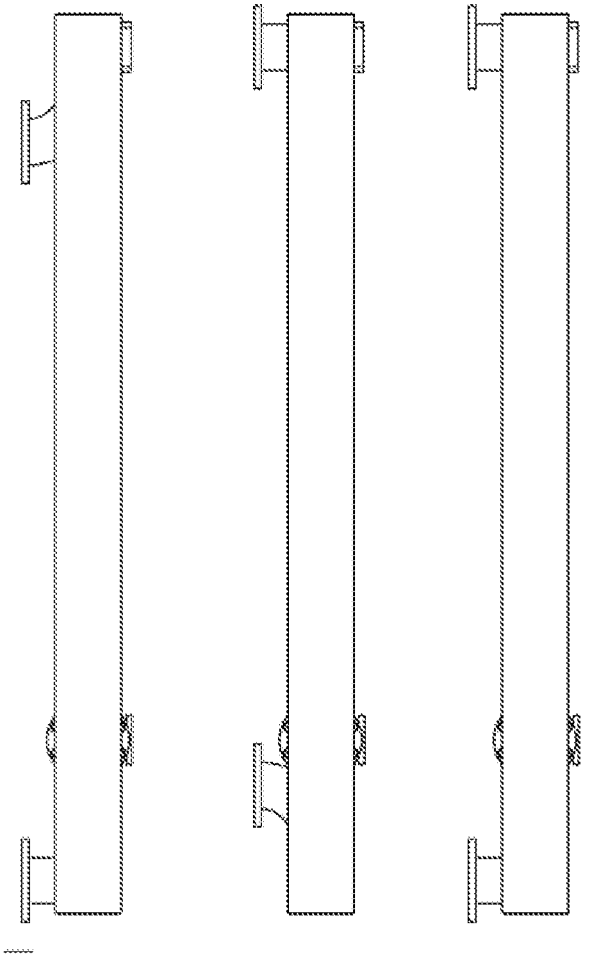

FIG. 18: Schematic representation of alternative points for connection of the radiators of the cooling system (23) to the transformer modules.

Figure 19:
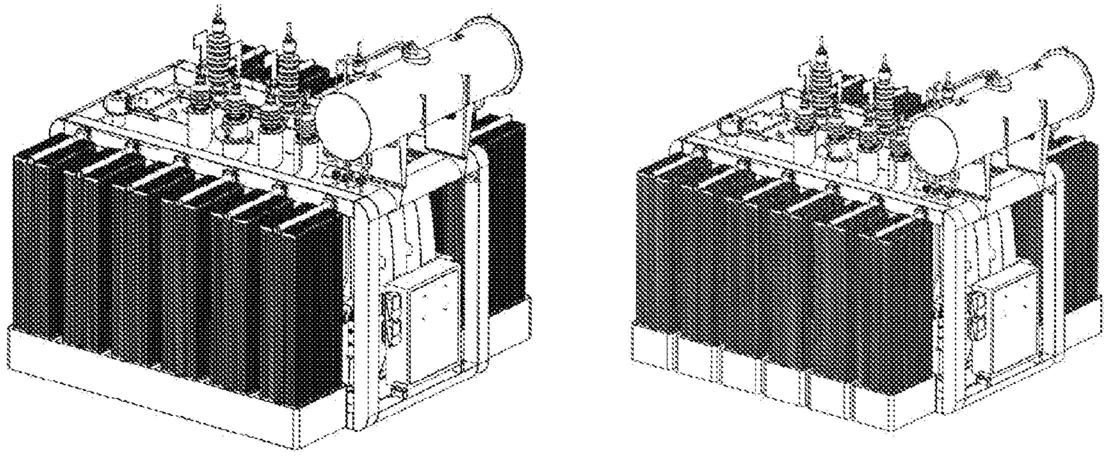

FIG. 19: Schematic representation of the fairings surrounding the ventilation system.

Figure 20:
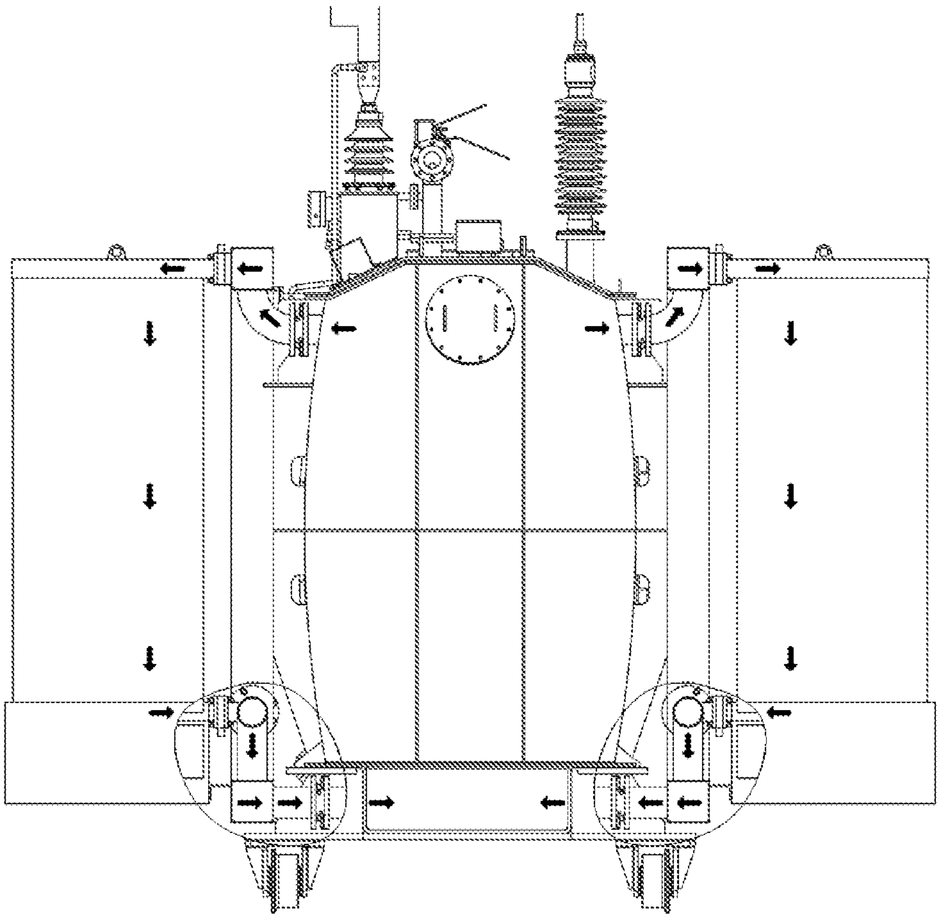

FIG. 20: Schematic representation of the distribution of cooling liquid.

Figure 21:
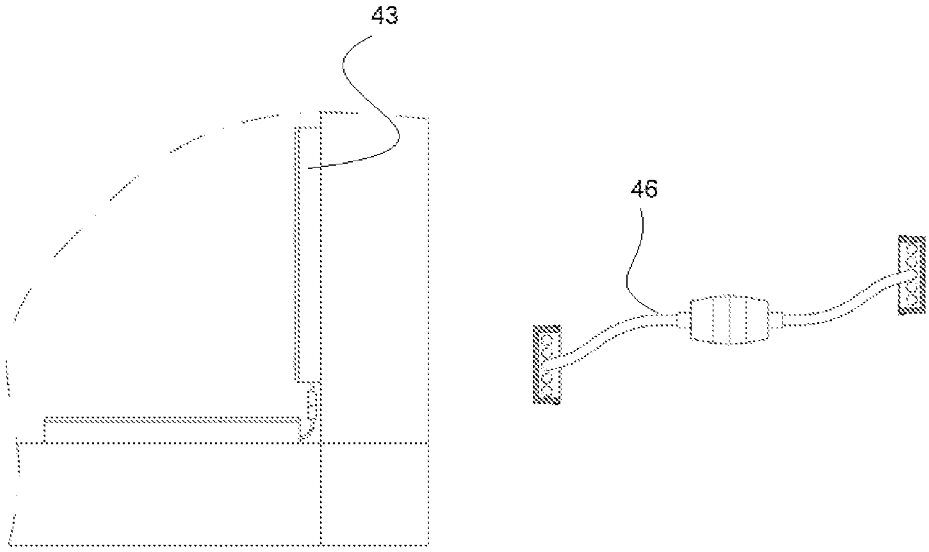

FIG. 21: Schematic representation of the electric connections between modules, where the following numerical references represent:

43—rails;

46—plugs.

The present description is not, naturally, in any way restricted to the embodiments presented in this document and a person with average knowledge of the area may foresee many possibilities of modification of the same without departing from the general idea, such as defined in the claims. The preferred embodiments described above, may obviously be matched between themselves. The following claims additionally define preferred embodiments.

The invention claimed is:

1. A modular system applied to transformers, comprising:

a structure comprising a plurality of modules having different dimensions, each module comprising piping that forms a closed shape that extends around a perimeter of a transformer tank, each module being coupled to the transformer tank by means of flanged connections, wherein the piping of larger dimensioned modules and of smaller dimensioned modules are coupled between each other by means of flanged connections, wedge, blind flange and by fitting, and the piping of the larger dimensioned modules comprise in their interior outlines and channels and in their exterior rails and the larger dimensioned modules support ventilation and cooling systems in their horizontal piping and the smaller dimensioned modules, which are comprised of vertical piping and upper and lower horizontal piping, support auxiliary circuit boxes, monitoring systems and valve piping.

2. The modular system applied to transformers according to claim 1, wherein the piping of the larger dimensioned modules and of the smaller dimensioned modules are coupled between each other by flanged wedge connection through a machined blind flange, with a threaded screw and with resource to a washer and screw.

3. The modular system applied to transformers according to claim 1, wherein the piping of the larger dimensioned modules and of the smaller dimensioned modules are coupled between each other by a connection made through the fitting of a bent plate belonging to one of the piping where an upper and a lower bearings are used placed respectively in the lower and upper and outline of the piping, wherein the upper bearing is used as fitting and the lower bearing presents a threaded hole to guarantee a fixation through a screw and washer.

4. The modular system applied to transformers according to claim 1, wherein the piping of the larger dimensioned modules and of the smaller dimensioned modules are coupled between each other through a blind flange with a shape in the extremity so as to fit with the other piping to be connected, through a washer and a screw.

5. The modular system applied to transformers according to claim 1, wherein the piping of the larger dimensioned modules and of the smaller dimensioned modules are coupled between each other by means of two bearings, that function as fitting to a flange with freedom of movement and which is screwed by means of a screw and washer.

6. The modular system applied to transformers according to claim 1, wherein a cooling liquid circulates through horizontal pipings between the transformer tank and one or more radiators of a cooling system and through the horizontal pipings being connected to the transformer tank by means of a flanged connection, with piping and flange and with valve integration, where the referred flanged connection is guaranteed with the use of screws, nuts and washers.

7. The modular system applied to transformers according to claim 6, wherein the connection between the horizontal piping and transformer tank is made in each exit/entry of the cooling liquid of the transformer tank.

8. The modular system applied to transformers according to claim 6, wherein a number of radiators of the cooling system is configurable.

9. The modular system applied to transformers according to claim 1, wherein a ventilation system is surrounded by fairings, which may be individual or whole, covering all the modules or just each one of the modules of the ventilation system and wherein the modules of the ventilation system are configurable.

10. The modular system applied to transformers according to claim 1, wherein the piping of the larger dimensioned modules and of the smaller dimensioned modules are circular, oval, rectangular, or other polygon with a variable number of sides.

11. The modular system applied to transformers according to claim 1, wherein electrification cables of components and exterior equipment are positioned in rails coupled to the piping of each module or in the interior of the piping themselves, the outline thereof being adapted for this purpose.

12. The modular system applied to transformers according to claim 1, wherein electric connections between modules are guaranteed by sealed plugs that connect one by one.

13. The modular system applied to transformers according to claim 1, wherein the monitoring systems are coupled to remote access modules.

* * * * *